United States Patent
Peterson et al.

(10) Patent No.: US 9,308,517 B1
(45) Date of Patent: Apr. 12, 2016

(54) COMPOSITE FILTRATION MEDIA FOR REMOVING BROAD SPECTRUM TOXIC CHEMICALS

(71) Applicant: U.S. Army Edgewood Chemical and Biological Command, APG, MD (US)

(72) Inventors: Gregory W. Peterson, Belcamp, MD (US); Joseph A. Rossin, Columbus, OH (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/200,898

(22) Filed: Mar. 7, 2014

Related U.S. Application Data (60) Provisional application No. 61/787,304, filed on Mar. 15, 2013.

(51) Int. Cl.
  *B01J 20/02* (2006.01)
  *B01J 20/06* (2006.01)
  *B01J 20/18* (2006.01)

(52) U.S. Cl.
  CPC ....................................... *B01J 20/18* (2013.01)

(58) Field of Classification Search
  CPC .......... B01J 20/06; B01J 20/0211; B01J 20/18
  See application file for complete search history.

(56) References Cited

U.S. PATENT DOCUMENTS

| | | | |
|---|---|---|---|
| 6,346,228 B1 * | 2/2002 | Choudhary et al. | 423/584 |
| 6,353,101 B1 * | 3/2002 | Eiermann et al. | 540/539 |

* cited by examiner

*Primary Examiner* — Peter F Godenschwager
(74) *Attorney, Agent, or Firm* — Ulysses John Biffoni (57) ABSTRACT

A composite filtration media for removing broad spectrum toxic chemicals from streams of air comprised of a physical mixture of a zirconium hydroxide analog material and a basic gas removal material is taught in which the composite filtration media is prepared by blending the zirconium hydroxide analog material in powder form with the basic gas removal material in powder form before pressing into pellets, tablets, briquettes, or the like. Subsequent grinding of the pressed material can be employed to produce a powder form of the composite filtration media. Cross-reaction of the composite components is reduced, thus prolonging the service life of the filtration media. Effectiveness in removing ammonia and sulfur dioxide are demonstrated for various compositions of the composite filtration media in both dry and humid conditions, including after aging for three weeks in humid conditions.

7 Claims, 6 Drawing Sheets

COMPOSITE FILTRATION MEDIA FOR REMOVING BROAD SPECTRUM TOXIC CHEMICALS

CROSS-REFERENCE TO RELATED APPLICATIONS

This application claims the benefit of priority from U.S. Provisional Patent Application No. 61/787,304 filed Mar. 15, 2013, the entire contents of which are incorporated herein by reference.

GOVERNMENT INTEREST

The present invention may be manufactured, used, and/or licensed by or for the United States Government.

BACKGROUND

1. Technical Field

The present invention relates generally to filtration media for removing contaminants from streams of air that pass through the filtration media, and, more particularly, to a filtration media comprised of a zirconium hydroxide analog for removing acid gases and an acidified component for removing basic gases.

2. Description of the Related Art

Air purification is of major concern to the military, first responders, and industrial workers. Applications in the field of air purification are often classified into individual protection and collective protection. An example of individual protection is the filtration incorporated into respirators worn by an individual person. Examples of collective protection include air filtration that is incorporated into the air handling system of a space that may be occupied by more than one person, such as a room, vehicle, or building.

Many of the prior art filters contain activated, impregnated carbons to filter toxic chemicals. These impregnated carbons have limited service life after exposure to the operating environment. That is, the filtration performance in removing toxic gases from air passing through the impregnated carbons deteriorates to a point considered unsuitable such that the filter needs to be replaced. Service life is limited by physical adsorption life and reactive life of the impregnated carbons. Physical adsorption life is reduced by adsorption of air pollutants. Reactive life is typically reduced by temperature and amount of water adsorbed by the carbon bed, adsorption or reaction with air pollutants, and any cross-reaction that may occur between or among the media components.

Prior art materials used for military filters typically contain impregnated carbons with the impregnants used to provide protection against acidic or acid-forming gases. These filters typically lack sufficient removal capabilities against several basic or base-forming gases. The term "basic" will be used hereinafter to refer to both basic gases and gases that are basic forming. Similarly, the term "acidic" will be used hereinafter to refer to both acidic gases and gases that are acid forming.

Examples of acidic gas contaminants include, but are not limited to, sulfur dioxide ($SO_2$), hydrogen cyanide (HCN), chlorine ($Cl_2$), hydrogen chloride (HCl) and fuming nitric acid ($HNO_3$). Examples of basic gases include, but are not limited to, ammonia ($NH_3$) and methylamine ($CH_3NH_2$).

Other prior art filters, such as those developed under standards employed by the National Institute for Occupational Safety and Health (NIOSH) for applications requiring Chemical, Biological, Radiological, and Nuclear (CBRN) protection, contain impregnants for the removal of both acidic and basic gases. These materials provide substantial broad-spectrum removal capabilities, however, they also show aging due to interaction of the impregnants with one another within the carbon pore structure. That is, the reactive life of these filters is reduced not only by the temperature and amount of water adsorbed by the carbon bed due to the operating environment, but also due to a cross-reaction that occurs between or among the impregnants.

Related prior art filter media includes zirconium hydroxide as a component, which may be expressed as $Zr(OH)_4$. Zirconium hydroxide with the addition of zinc and other metals, along with triethylenediamine (TEDA) has been used to provide removal capabilities against a wide range of toxic acidic and oxidizable gases, such as chlorine, hydrogen chloride, hydrogen cyanide, phosgene, cyanogen chloride, sulfur dioxide, nitrogen dioxide, and the like. One shortcoming of the material, however, is that it provides limited removal of basic forming chemicals such as ammonia, methyl amine, and ethylene oxide.

Other prior art approaches use non-carbon materials for removal of basic gases. This includes use of zirconium hydroxide as a substrate impregnated with sulfuric acid and oxalic acid for ammonia removal. Zeolite H-ZSM-5 also has shown promise as an ammonia and ethylene oxide removal material, and has been demonstrated for military application in the Joint Service General Purpose Mask (JSGPM) program.

Other materials showing promise against basic gases are metal-organic frameworks. Specifically, the metal-organic frameworks or MOFs known as CuBTC and M-MOF-74 (where M stands for cobalt, copper, magnesium, nickel, zinc and/or other metals) have shown substantial removal capabilities. These metal-organic frameworks, however, are not effective at removing acidic gases.

In summary, prior art filtration media generally suffers in applications that require removal performance against a broad spectrum of acidic and basic gases, or the filtration media has a limited service life, or both broad-spectrum removal performance and service life are suboptimal.

Accordingly, there is a need for filtration media capable of removing a broad spectrum of contaminants from streams of air that pass through the filtration media with a satisfactory performance life when exposed to normal environmental conditions of humidity, temperature, and the possibility of cross-reaction within the filtration media.

SUMMARY

In view of the foregoing, exemplary embodiments of a composite filtration media for removing broad spectrum toxic chemicals are provided along with test results. The present invention may be embodied in the form of filter media, a filter bed, or a filter component. The media may be in the form of powder, pellets, tablets, briquettes, or the like. The present invention may be used in individual protection applications such as respirators and in collective protection applications. These and other aspects of the present invention will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the present invention includes all such modifications.

DETAILED DESCRIPTION

The present invention and the various features and advantageous details thereof are explained more fully with reference to non-limiting embodiments that are illustrated in the accompanying drawings and detailed in the following description. Descriptions of well-known materials and methods, such as powder preparation and mixing, are omitted so as to not unnecessarily obscure the embodiments herein. The examples used herein are intended merely to facilitate an understanding of ways in which the embodiments herein may be practiced and to further enable those of skill in the art to practice the present invention. Accordingly, the examples should not be construed as limiting the scope of the present invention.

The term "composite" as used herein refers to the physical mixing of powdered materials, followed by pressing into a "solid form" such as pellets, tablets, briquettes, or the like. A powder is defined herein as particles less than approximately 100 micrometers in size. If desired for a given product formulation, the pressed pellets, tablets, briquettes, or the like (solid form) can be ground to a smaller size, such as a powder for some applications, or 12×30 or 20×40 mesh sizes, to name two examples, in other applications. Those with ordinary skill in the art to which the invention pertains will readily understand the processes of physical mixing of powdered materials, pressing, grinding, and mesh sizes used in filtration.

The advantage to physically mixing different materials in powder form followed by pressing, as opposed to impregnating materials with all moieties capable of removing acidic and basic gases, is that the impregnants are not in direct contact with one another, but are segregated onto different substrates. This segregation serves to minimize interactions between the dissimilar functional groups. By physically separating the different materials, albeit on a micro scale, service life can be improved.

Example 1

In a first example of the invention as taught herein, zinc-zirconium hydroxide-TEDA (ZZT) and zirconium hydroxide impregnated with 10% sulfuric acid (SZ) was made into a composite by physically mixing the different materials in powder form followed by pressing. Three different composite configurations were investigated for ammonia and sulfur dioxide removal along with 100% ZZT as a baseline. The three compositions were 85% ZZT with 15% SZ; 75% ZZT with 25% SZ; and 50% ZZT with 50% SZ. (All composition percentages noted herein are based on weight.)

Figure 1:
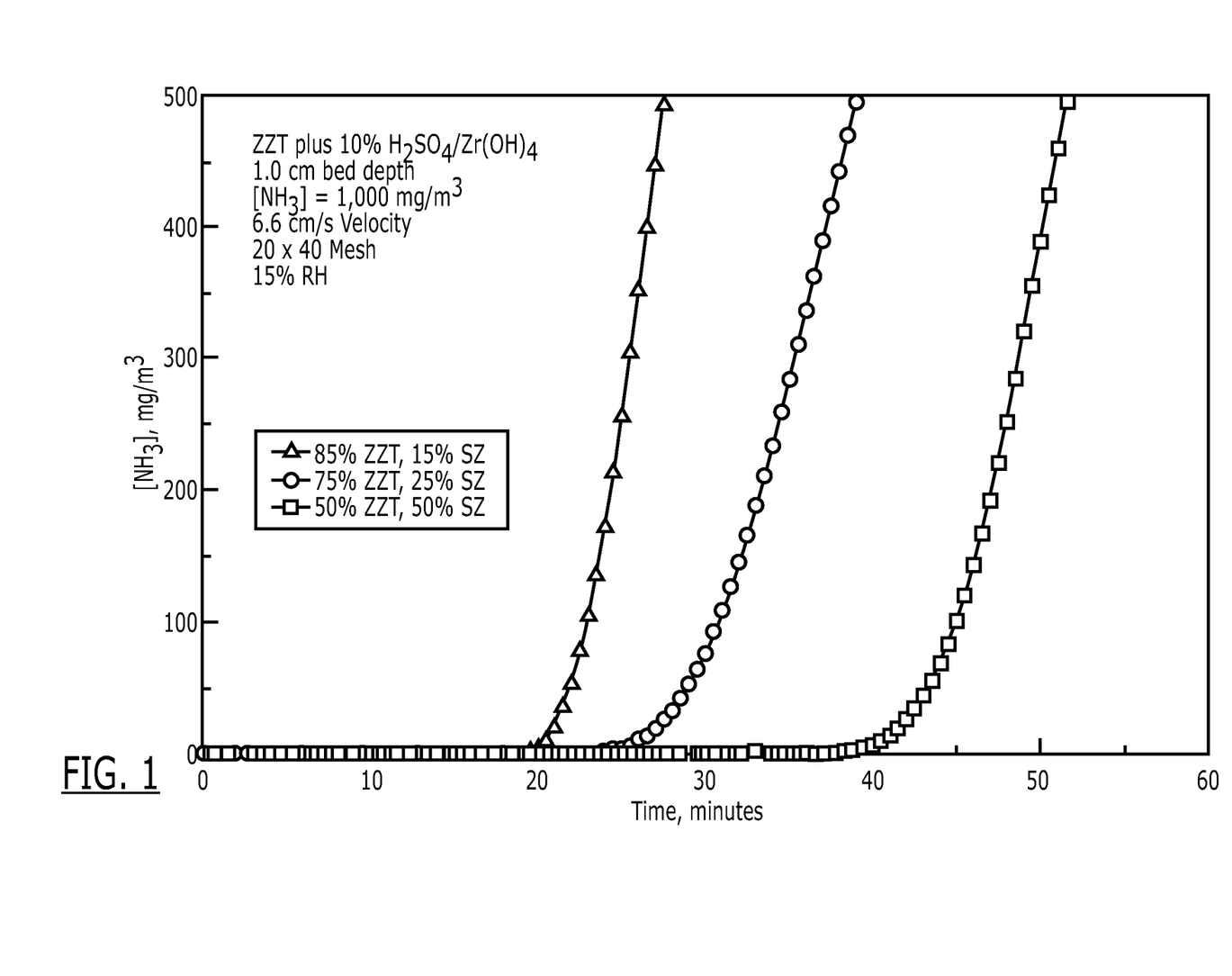
FIG. 1 is a graph showing ammonia breakthrough curves for three composite filtration media.
Figure 2:
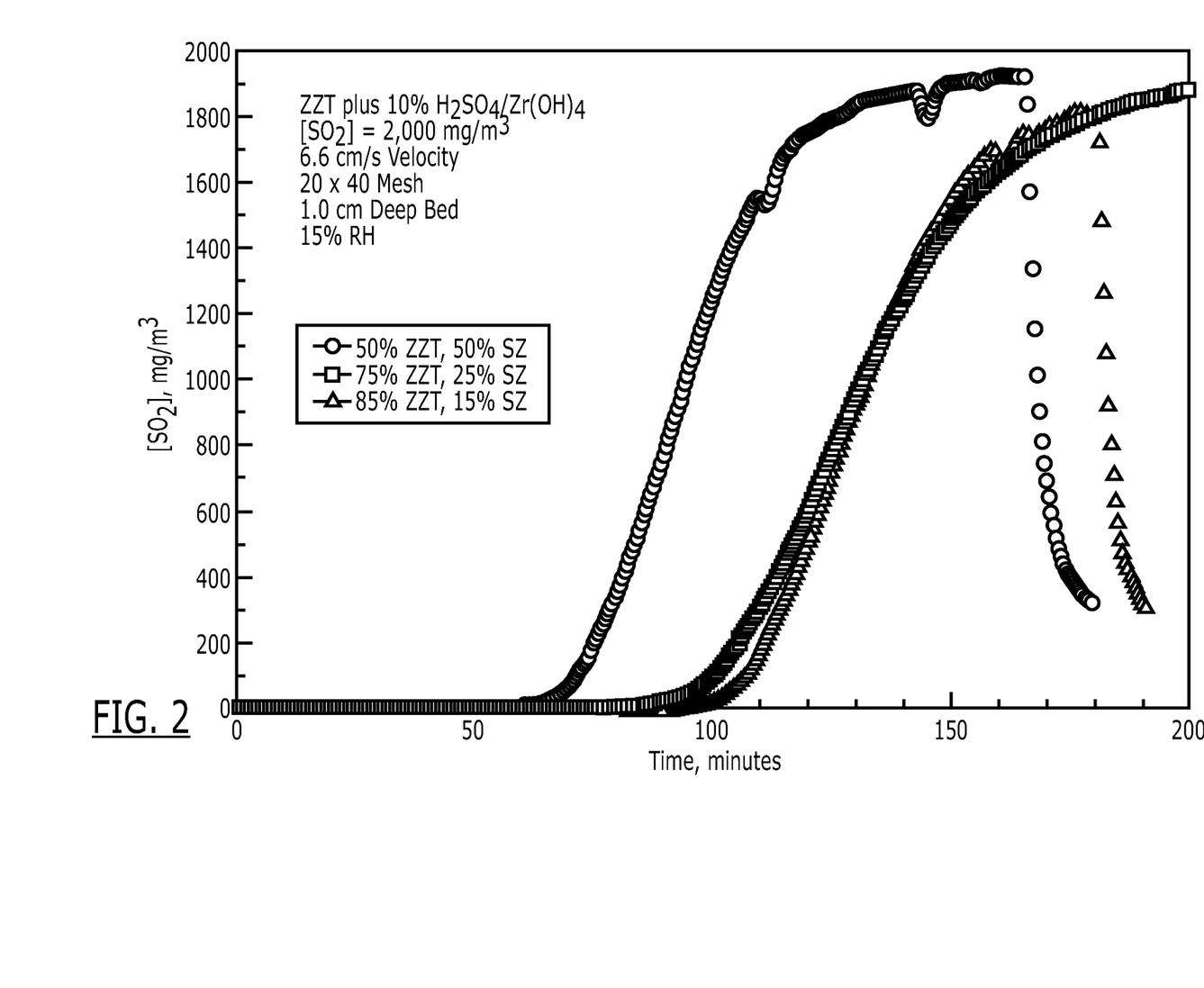
FIG. 2 is a graph showing sulfur dioxide breakthrough curves for three composite filtration media.

FIGS. 1 and 2 illustrate the ammonia and sulfur dioxide breakthrough curves, respectively, for these composite configurations and Table 1 summarizes the results. As illustrated, the breakthrough time for ammonia is increased from a low of 17 minutes with the baseline of 100% ZZT to a high of 42.5 minutes with the composition of 50% ZZT and 50% SZ. While sulfur dioxide breakthrough time decreases with reduced ZZT, the breakthrough time for sulfur dioxide is still 62.5 minutes with the 50-50 ZZT/SZ composition. The breakthrough times for ammonia and sulfur dioxide are therefore relatively balanced (42.5 and 62.5 minutes, respectively) with the 50-50 composition, or equal amounts, of ZZT and SZ.

As illustrated in this example, a composition of ZZT and SZ can be designed to effectively remove basic gases, as represented by the ammonia in these breakthrough tests, and to effectively remove acidic gases, as represented by the sulfur dioxide in these breakthrough tests. This is accomplished by adjusting the ratio of ZZT to SZ such that both basic and acidic gases are removed at the desired performance level. That is, as taught herein, a person with ordinary skill in the art is thus enabled to tune or adjust performance towards acidic gases or towards basic gases by changing the weight percentage of the composition.

TABLE 1

Comparison of sulfur dioxide ($SO_2$) and ammonia ($NH_3$) breakthrough times for ZZT baseline and three compositions of ZZT and SZ.

| Sample | $SO_2$ Breakthrough Time | $NH_3$ Breakthrough Time |
|---|---|---|
| 100% ZZT Baseline | 106 min | 17.0 min |
| 85% ZZT with 15% SZ | 96.5 min | 21.5 min |
| 75% ZZT with 25% SZ | 88.0 min | 28.0 min |
| 50% ZZT with 50% SZ | 62.5 min | 42.5 min |

Additional toxic chemicals, such as hydrogen cyanide and cyanogen chloride, also were evaluated with similar results. That is, a similar trade-off occurred with 100% ZZT performing the best at removing hydrogen cyanide and cyanogen chloride, and such removal performance decreasing with increasing SZ content, but in a manner that allows for performance tuning towards the removal of acidic gases or towards the removal of basic gases by changing the weight percentage of the composition.

Example 2

In a second example, composites were prepared from ZZT and zirconium hydroxide impregnated with 25% oxalic acid as well as ZZT and 25% H-ZSM-5. Also tested was a composition of 75% ZZT/25% SZ sample. The composite filtration media were exposed to prolonged periods (24 hours) of moisture (80% relative humidity), followed by ammonia and sulfur dioxide breakthrough testing. Tables 2 and 3 summarize the results, which show good stability after moisture exposure. In particular, no significant degradation with humidity occurred and the three composite filtration media performed slightly better under most of the humid conditions tested. The one exception was 75% ZZT with 25% H-ZSM-5, which had a slightly shorter breakthrough time for sulfur dioxide under humid conditions, however, the 1-minute difference is not considered significant.

TABLE 2

Summary of ammonia ($NH_3$) breakthrough times prior to and following humid exposure.

| Sample | As-Received $NH_3$ Breakthrough Time | Humid Exposed $NH_3$ Breakthrough Time |
|---|---|---|
| 100% ZZT Baseline | 16 min | — |
| 75% ZZT with 25% H-ZSM-5 | 26 min | 28 min |
| 75% ZZT with 25% Oxac/Zr(OH)$_4$ | 25 min | 28 min |
| 75%/ZZT with 25% $H_2SO_4$/Zr(OH)$_4$ | 27.5 min | 30.5 min |

TABLE 3

Summary of sulfur dioxide ($SO_2$) breakthrough times prior to and following humid exposure.

| Sample | As-Received $SO_2$ Breakthrough Time | Humid Exposed $SO_2$ Breakthrough Time |
|---|---|---|
| 100% ZZT Baseline | 106 min | — |
| 75% ZZT with 25% H-ZSM-5 | 66 min | 65 min |
| 75% ZZT with 25% Oxac/Zr(OH)$_4$ | 83.5 min | 86.5 min |
| 75% ZZT with 25% $H_2SO_4$/Zr(OH)$_4$ | 88 min | 87 min |

Performance under humid conditions as demonstrated herein is an important performance consideration because many, if not most real-world applications for individual and collective protection require filtration of air at various humidity levels from relatively dry air to very humid air.

The composite filtration media as taught herein were stored at high temperatures (160° F.) for prolonged periods (three weeks), then tested for basic and acidic gas breakthrough times, demonstrating good stability under these conditions as summarized in Tables 4 and 5. As illustrated, a blended ZZT/SZ material shows no degradation in performance in ammonia removal, and a very small decrease in sulfur dioxide removal, after aging for three weeks and exposure to humidity. Similarly, a mixture of ZZT and H-ZSM-5 shows no degradation in sulfur dioxide performance, and only a small decrease in ammonia removal performance after aging for three weeks and exposure to humidity.

TABLE 4

Effects of storage on $SO_2$ and $NH_3$ breakthrough times for ZZT-$H_2SO_4$/Zr(OH)$_4$ blended media.

| Sample | $SO_2$ Breakthrough Time | $NH_3$ Breakthrough Time |
|---|---|---|
| As Prepared | 88 min | 28 min |
| Stored at 160° F. As-Received | 79 min | 30 min |
| Stored Humidified | 82 min | 27 min |

TABLE 5

Effects of storage on $SO_2$ and $NH_3$ breakthrough times for ZZT-H-ZSM-5 blended media.

| Sample | $SO_2$ Breakthrough Time | $NH_3$ Breakthrough Time |
|---|---|---|
| As Prepared | 66 min | 27 min |
| Stored at 160° F. As-Received | 64 min | 25 min |
| Stored Humidified | 75 min | 23 min |

Example 3

In this example, zirconium hydroxide (Z) was mixed with CuBTC MOF (C), and then pressed into tablets at a pressure of 5000 psi. The resulting materials were crushed and then evaluated in a small scale breakthrough system. Further details of this example are provided in the paper by Peterson, et al., entitled, "Zirconium Hydroxide-Metal-Organic Framework Composites for Toxic Chemical Removal," as published in the Journal of Industrial & Engineering Chemistry Research, 18 Mar. 2013, Volume 52, pages 5462-5469, the entire contents of which are incorporated herein by reference.

Figure 3A:
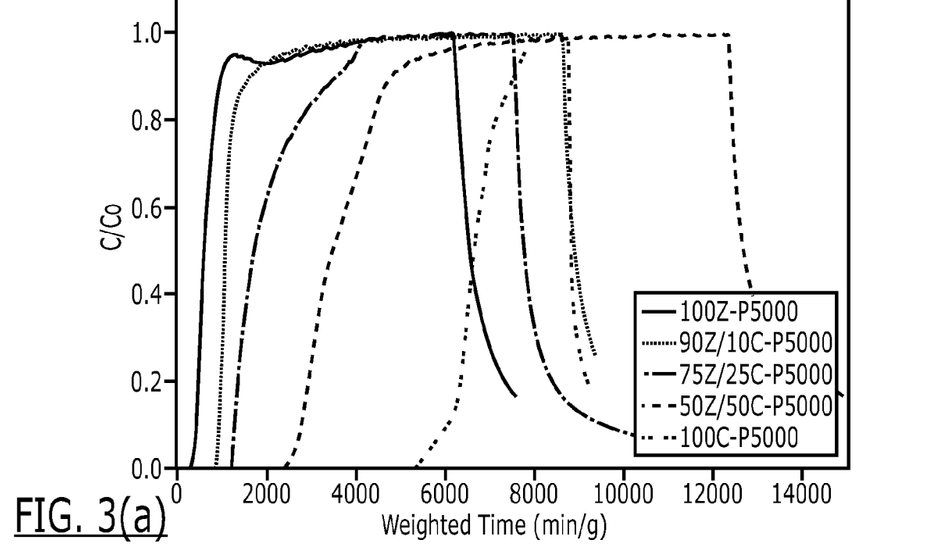
FIGS. 3(a) through 3(c) are a set of graphs showing ammonia breakthrough of composite filtration media under dry and humid conditions.
Figure 3B:
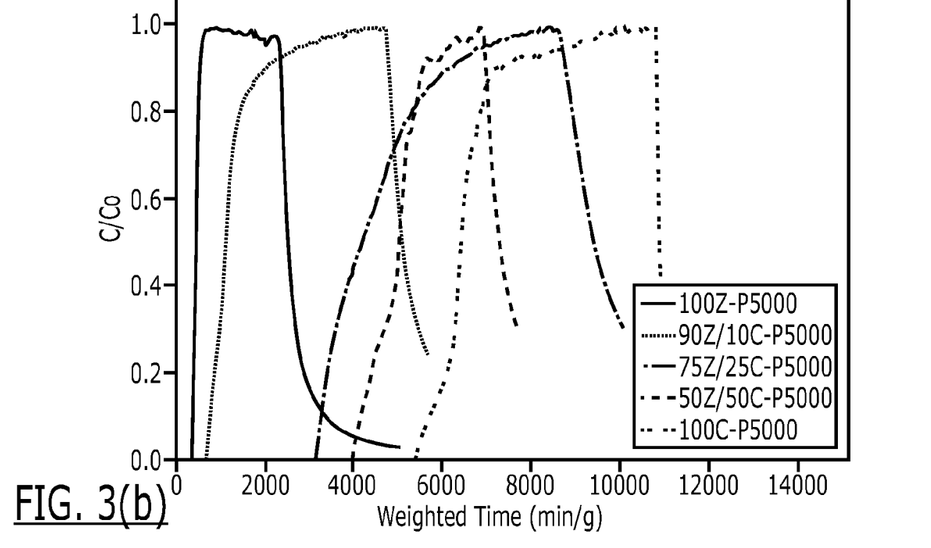
Figure 3C:
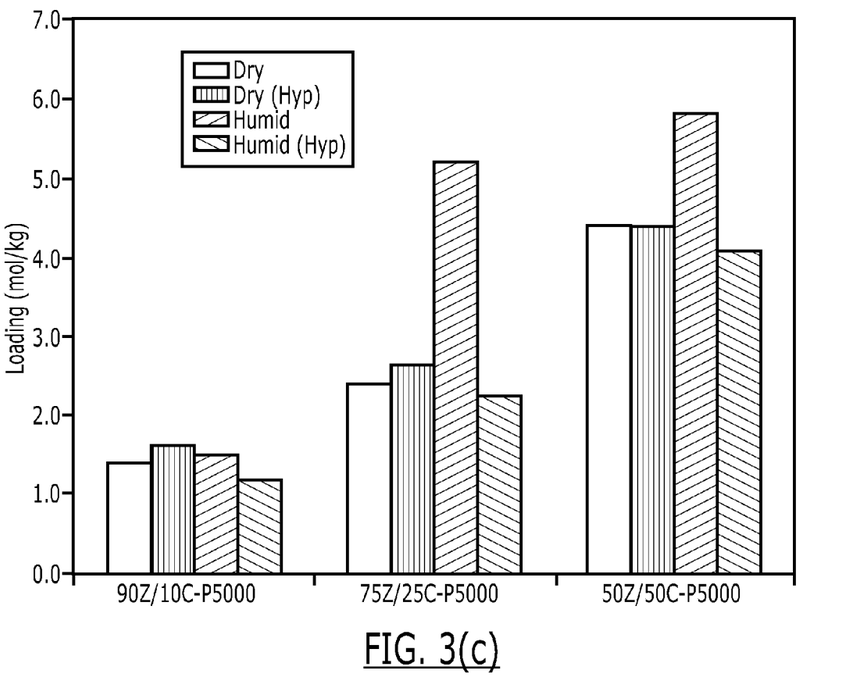
Figure 4A:
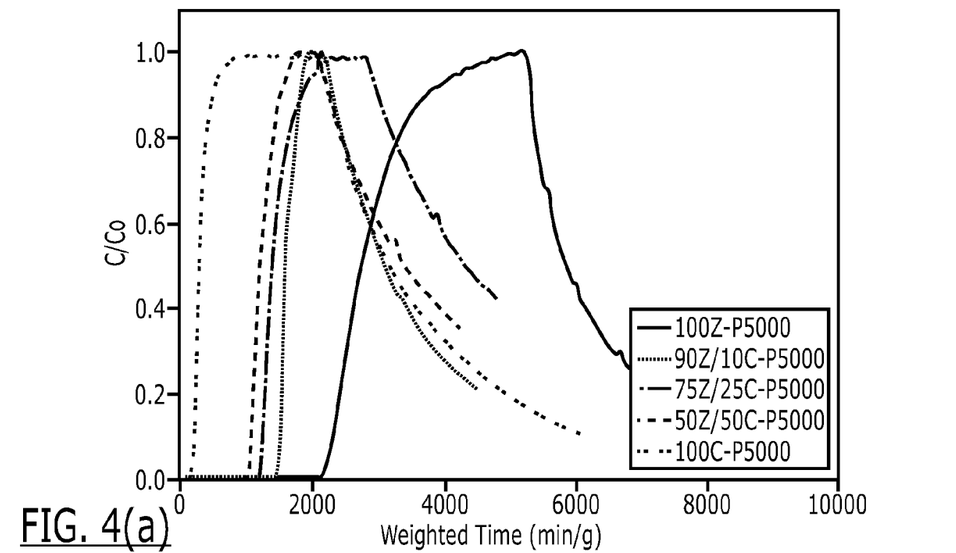
FIGS. 4(a) through 4(c) are a set of graphs showing sulfur dioxide breakthrough of composite filtration media under dry and humid conditions.
Figure 4B:
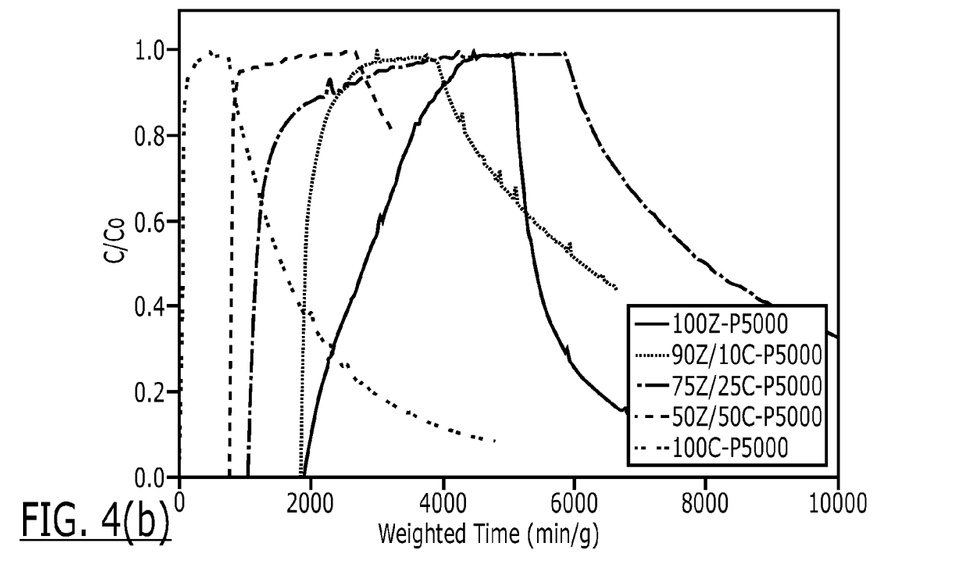
Figure 4C:
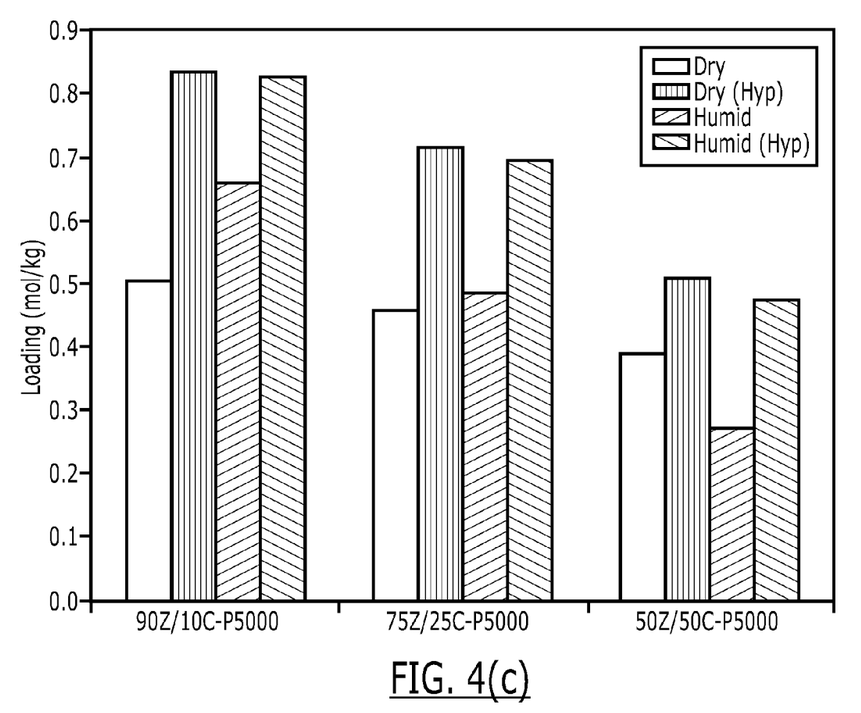

FIGS. 3 and 4 show the ammonia and sulfur dioxide breakthrough results, respectively. TEDA has also been added to the composite, which allows for removal of cyanogen chloride and other chemicals. In FIG. 3, the ammonia breakthrough curves shift to the right with increasing weight percent CuBTC, resulting in high loadings. FIG. 4 shows the opposite effect for sulfur dioxide; as weight percent CuBTC increases, $SO_2$ removal performance decreases.

In summary, the forgoing description and accompanying tables and drawings teach how to form composite structures using zirconium hydroxide analogs and additional materials, such as acidified zirconium hydroxide, zeolites, and metal-organic frameworks, to produce a composite filtration media for removing broad spectrum toxic chemicals for protection against both acidic and basic gas contaminates. The term "zirconium hydroxide analog" as used herein refers to any material based on the zirconium hydroxide substrate, such as Zr(OH)$_4$ alone; or Zr(OH)$_4$ with one or more transition metals such as cobalt, zinc, and silver; or Zr(OH)$_4$ with TEDA; or any combination thereof. The term "transition metal" as used herein refers to any element in the d-block of the periodic table. The present invention may be embodied in the form of a filter media, a filter bed, or a filter component. The composite may be used in the form of a powder, pellets, tablets, briquettes, or the like, and may be employed in individual protection applications, such as respirators, and in collective protection applications.

While specific exemplary embodiments of the invention have been described, it will be understood that additional embodiments and various modifications may be made without departing from the spirit and scope of the invention. For example, the composition ratios or percentages of the materials cited in examples can be varied and additional materials can be added. Accordingly, these and other embodiments of the invention fall within the scope of the claims below.

What is claimed is:

1. A composite filtration media for removing breed spectrum toxic chemicals from streams of air, comprising:
   a zirconium hydroxide analog material, wherein said zirconium hydroxide analog material comprises zinc-zirconium hydroxide-triethylenediamine (ZZT); and
   a basic gas removal material;

wherein said composite filtration media is prepared by a first process step of blending said zirconium hydroxide analog material in powder form with said basic gas removal material in powder form followed by a second process step of pressing said blended powder materials into a solid form.

2. The composite filtration media of claim 1, wherein aid basic gas removal material is comprised of acidified zirconium hydroxide.

3. The composite filtration media of claim 1, wherein said basic gas removal material is zirconium hydroxide impregnated with an acid selected from the group consisting of sulfuric acid, oxalic acid, metal chloride, sulfate, and phosphoric acid.

4. The composite filtration media of claim 3, wherein said acid comprises sulfuric acid.

5. The composite filtration media of claim 3, wherein said acid comprises oxalic acid.

6. The composite filtration media of claim 1, wherein said basic gas removal material is selected from the group consisting of H-ZSM-5, CuBTC, and a metal-organic framework.

7. The composite filtration media of claim 6, wherein said metal-organic framework comprises M-MOF-74.

\* \* \* \* \*